United States Patent
Wu et al.

(10) Patent No.: US 11,535,556 B2
(45) Date of Patent: Dec. 27, 2022

(54) PHOSPHOGYPSUM NON-SINTERED CERAMSITE LIGHT AGGREGATE AND PREPARATION METHOD THEREOF

(71) Applicant: Hubei Changyao New Materials Co., Ltd., Yichang (CN)

(72) Inventors: Chiqiu Wu, Yichang (CN); Wei Lyu, Yichang (CN); Tao Sun, Yichang (CN); Wenhui Gong, Yichang (CN); Biao Hu, Yichang (CN); Yuzhen Wang, Yichang (CN)

( * ) Notice: Subject to any disclaimer, the term of this patent is extended or adjusted under 35 U.S.C. 154(b) by 60 days.

(21) Appl. No.: 17/024,679

(22) Filed: Sep. 17, 2020

(65) Prior Publication Data

US 2021/0163353 A1    Jun. 3, 2021

(30) Foreign Application Priority Data

Sep. 18, 2019 (CN) .......................... 201910882397.4

(51) Int. Cl.
| | | |
|---|---|---|
| *C04B 18/02* | (2006.01) | |
| *C04B 28/14* | (2006.01) | |
| *C04B 111/40* | (2006.01) | |
| *C04B 111/27* | (2006.01) | |

(52) U.S. Cl.
CPC .......... *C04B 18/027* (2013.01); *C04B 18/021* (2013.01); *C04B 28/143* (2013.01); *C04B 2111/27* (2013.01); *C04B 2111/40* (2013.01)

(58) Field of Classification Search
CPC ... C04B 18/027; C04B 18/021; C04B 28/143; C04B 2111/27; C04B 2111/40; C04B 28/006; C04B 18/02; C04B 28/14
See application file for complete search history.

(56) References Cited

FOREIGN PATENT DOCUMENTS

| CN | 106431101 A | * | 2/2017 | |
| CN | 109467348 A | * | 3/2019 | ............. C04B 28/02 |
| KR | 20020096785 A | * | 12/2002 | |

OTHER PUBLICATIONS

CN-109467348-A, machine translation (Year: 2019).*
CN-106431101-A, machine translation (Year: 2017).*
KR-20020096785-A, machine translation (Year: 2002).*

* cited by examiner

*Primary Examiner* — Kevin E Yoon
*Assistant Examiner* — Marites A Guino-O Uzzle

(57) ABSTRACT

A phosphogypsum non-sintered ceramsite light aggregate composed of water and a mixture composed of phosphogypsum, mineral powder and cement. Raw materials of the mixture have weight percentages of phosphogypsum 80-90%, mineral powder 3.3-10%, cement 6.5-10%; the water has a weight of 17% of the total weight of the mixture. A method of preparing the phosphogypsum non-sintered ceramsite light aggregate. The phosphogypsum non-sintered ceramsite light aggregate is prepared by modification, granulation, curing, crushing, sieving and other processes by using phosphogypsum as a main material, cement as an alkaline activator, mineral powder as an active material.

7 Claims, No Drawings

PHOSPHOGYPSUM NON-SINTERED CERAMSITE LIGHT AGGREGATE AND PREPARATION METHOD THEREOF

FIELD OF THE INVENTION

The invention relates to the technical field of engineering materials, in particular to a phosphogypsum non-sintered ceramsite light aggregate and a preparation method thereof.

BACKGROUND OF THE INVENTION

Phosphogypsum is industrial waste produced in the process of decomposing phosphate rock with sulfuric acid and extracting phosphoric acid by chemical enterprises. The production of 1 ton of phosphoric acid will produce about 5 tons of phosphogypsum. The main chemical component of phosphogypsum is dihydrate gypsum ($CaSO_4.2H_2O$), and phosphogypsum contains a small amount of phosphoric acid, calcium phosphate, residual acid, soluble $P_2O_5$, fluoride, heavy metals, organic matter and other impurities. It is usually white or dark gray as a wet fine powder. According to statistics, as of 2015, the annual emission of phosphogypsum in our country has exceeded 70 million tons; the cumulative stock of phosphogypsum solid waste in our country has exceeded 100 million tons in 2009 and reached 250 million tons in 2018.

Phosphogypsum not only occupies a large amount of land, but also causes serious pollution to soil, water and air, and even poses a safety hazard. Starting from the requirements of national industrial policy and the needs of wall material reform, the comprehensive utilization of resources and the development of circular economy are a major technical and economic policy of our country and a long-term strategic policy in the national economic and social development, the transformation of the mode of saving resources, protecting environment, improving economic efficiency, promoting economic growth from extensive form to intensive form, it has an extremely important significance for the realization of optimal allocation of resources and sustainable development.

SUMMARY OF INVENTION

The object of the present invention is to provide a phosphogypsum non-sintered ceramsite light aggregate for construction and a preparation method thereof. It is a high-strength lightweight material with good waterproof performance prepared by modification, granulation, curing, crushing, sieving and other processes by using phosphogypsum as a main material (phosphogypsum accounts for more than 80%), cement as an alkaline activator, mineral powder as an active material. It can be widely used in products such as highway roadbed materials, C40 and below concrete, cement concrete blocks, and so on.

In order to solve the above technical problems, the technical solutions of the present invention are: a phosphogypsum non-sintered ceramsite light aggregate is composed of water and a mixture composed of phosphogypsum, mineral powder and cement, the raw materials of the mixture have weight percentages of phosphogypsum 80-90%, mineral powder 3.3-10%, cement 6.5-10%, the water has a weight of 17% of the total weight of the mixture.

Compared with prior arts, the present invention has the following advantageous effects:

Persulfur phosphogypsum slag cement is a new green, low-carbon, non-calcined cement invented by professor Lin Zongshou of Wuhan University of Technology. It is a hydraulicity cementitious material mainly composed of excess phosphogypsum, slag powder and alkaline activator. It can form plastic slurry after adding an appropriate amount of water. It can harden in both air and water, a large amount of uncombined free gypsum in the hydration product can cement sand, stone and other materials together firmly. The mass percentage content of phosphogypsum in the powder should be between 40% and 60%.

Phosphogypsum non-sintered ceramsite light aggregate is a new technology developed, tested and extended on the theoretical basis of persulfur phosphogypsum slag cement. It makes full use of the characteristics of paste strength>mortar strength>concrete strength of persulfur phosphogypsum slag cement, a new building material product with non-sintered, low energy consumption, eco-friendly and pollution-free is prepared by using more than 80% phosphogypsum as the main raw material through natural hydration and process. Phosphogypsum non-sintered ceramsite light aggregate can be widely used in highway subgrade materials, C40 and below concrete, cement concrete blocks and other products. It is a new comprehensive utilization method of phosphogypsum that phosphogypsum is made into phosphogypsum non-sintered ceramsite light aggregate. Gypsum ceramsite products and their hollow blocks have the advantages of low bulk density, good thermal insulation effect, convenient construction, no hollowing and no falling off in plastering, which makes the economic and social benefits of which more significant. With the need of wall reform, its utilization is increasing.

The phosphogypsum non-sintered ceramsite light aggregate is prepared by using phosphogypsum as a main material (phosphogypsum accounts for more than 80%), cement as an alkaline activator, mineral powder as an active material, which can be widely used in products such as highway roadbed materials, C40 and below concrete, cement concrete blocks, and so on, the main waste recycling of phosphogypsum was realized, and the optimized allocation of resources was realized.

The present invention further discloses a method of preparing the phosphogypsum non-sintered ceramsite light aggregate, wherein the method comprises the following steps:

S1: putting phosphogypsum, mineral powder, cement, and water into a mixer according to the weight percentages and mixing uniformly;

S2: granulating the above-mentioned uniformly mixed raw materials with adding water according to the weight percentage, wherein the granulation equipment has an inclination angle of 60-82°, and the water is added at a rate of 1.25-1.5 L/min;

S3: performing initial setting and final setting of the phosphogypsum ceramsite balls produced in S2 at 15-30° C.; wherein the initial setting time is 12-20 h, and the final setting time is 24-36 h; curing for 14-28 days by using water immersion or continuous sprinkling water after the initial setting and final setting;

S4: transferring the phosphogypsum ceramsite balls produced in S3 to a site with dust-proof facilities for stacking, and drying naturally until the moisture content of the phosphogypsum ceramsite balls is not more than 8%;

S5: crushing the phosphogypsum ceramsite balls to a particle size of 10-40 mm to obtain the phosphogypsum ceramsite balls light aggregate;

S6: sieving and classifying the phosphogypsum ceramsite balls light aggregate, and storing according to classification;

S7: classifying and inspecting in batches and identifying the phosphogypsum ceramsite balls light aggregate.

The phosphogypsum ceramsite balls light aggregate was prepared herein by subjecting raw materials to specific process conditions of modification, granulation, curing, crushing, sieving and other process steps. The process is simple and easy to be controlled, and the industrial production is easy be realized and the waste can be turned into treasures, it has an extremely important significance for saving resources, realizing optimized allocation of resources and sustainable development.

DETAILED DESCRIPTION

The specific content of the present invention is described in detail below in conjunction with embodiments.

Example 1: phosphogypsum non-sintered ceramsite light aggregate, the main raw materials and their weight parts are as follows: 800 kg of phosphogypsum, 100 kg of mineral powder, 100 kg of cement, 170 kg of water.

Example 2: phosphogypsum non-sintered ceramsite light aggregate, the main raw materials and their weight parts are as follows: 850 kg of phosphogypsum, 85 kg of mineral powder, 65 kg of cement, 170 kg of water.

Example 3: phosphogypsum non-sintered ceramsite light aggregate, the main raw materials and their weight parts are as follows: 880 kg of phosphogypsum, 55 kg of mineral powder, 65 kg of cement, 170 kg of water.

Example 4: phosphogypsum non-sintered ceramsite light aggregate, the main raw materials and their weight parts are as follows: 900 kg of phosphogypsum, 33 kg of mineral powder, 67 kg of cement, 170 kg of water.

The production process of the phosphogypsum non-sintered ceramsite light aggregate in examples 1-4 is as follows:

S1: putting the above materials into a mixer and mixing uniformly;

S2: granulating the above mentioned uniformly mixed raw materials with adding water according to the weight percentage, wherein the granulation equipment has an inclination angle of 60°, and the water is added at a rate of 1.5 L/min;

S3: performing initial setting and final setting of the phosphogypsum ceramsite balls produced in S2 at 20° C.; wherein the initial setting time is 16 h and the final setting time is 30 h; curing for 15 days by using water immersion after the initial setting and final setting;

S4: transferring the phosphogypsum ceramsite balls produced in S3 to a site with dust-proof facilities for stacking, and drying naturally until the moisture content of the phosphogypsum ceramsite balls is 6%;

S5: crushing the phosphogypsum ceramsite balls to a particle size of 10-40 mm to obtain the phosphogypsum ceramsite balls light aggregate;

S6: sieving and classifying the phosphogypsum ceramsite balls light aggregate, and storing based on classification;

The detection results were shown in table 1:

TABLE 1

Statistical table of detection structures of examples 1-4

| Example | Bulk density | Cylindrical compress strength | Water absorption for 1 h | Softening coefficient |
| --- | --- | --- | --- | --- |
| 1 | 998 kg/m$^3$ | 6.8 MPa | 4.1% | 0.98 |
| 2 | 970 kg/m$^3$ | 6 MPa | 5.7% | 0.90 |
| 3 | 965 kg/m$^3$ | 5.1 MPa | 7.9% | 0.86 |
| 4 | 950 kg/m$^3$ | 4.5 MPa | 8.4% | 0.82 |

All performance indicators of the above-mentioned phosphogypsum non-sintered ceramsite light aggregate exceed the performance standards for light aggregate in the national standard GB/T17431.2-20101. Wherein the phosphogypsum non-sintered ceramsite light aggregate of example 1 is applicable to phosphogypsum light aggregate for concrete and concrete products, the phosphogypsum non-sintered ceramsite light aggregate of examples 2-4 is applicable to phosphogypsum water-stable layer.

There are other preferred parameters of the process for preparing the phosphogypsum non-sintered ceramsite light aggregate of Example 1, which is described in detail in examples.

Example 5

The production process of the phosphogypsum non-sintered ceramsite light aggregate in example 1 is as follows:

S1: putting the above materials into a mixer and mixing uniformly;

S2: granulating the above mentioned uniformly mixed raw materials with adding water according to the weight percentage, wherein the granulation equipment has an inclination angle of 60°, and the water is added at a rate of 1.5 L/min;

S3: performing initial setting and final setting of the phosphogypsum ceramsite balls produced in S2 at 20° C.; wherein the initial setting time is 16 h and the final setting time is 30 h; curing for 20 days by using water immersion after the initial setting and final setting;

S4: transferring the phosphogypsum ceramsite balls produced in S3 to a site with dust-proof facilities for stacking, and drying naturally until the moisture content of the phosphogypsum ceramsite balls is 6%;

S5: crushing the phosphogypsum ceramsite balls to a particle size of 10-40 mm to obtain the phosphogypsum ceramsite balls light aggregate;

S6: sieving and classifying the phosphogypsum ceramsite balls light aggregate, and storing based on classification;

Example 6

The production process of the phosphogypsum non-sintered ceramsite light aggregate in example 1 is as follows:

S1: putting the above materials into a mixer and mixing uniformly;

S2: granulating the above mentioned uniformly mixed raw materials with adding water according to the weight percentage, wherein the granulation equipment has an inclination angle of 60°, and the water is added at a rate of 1.5 L/min;

S3: performing initial setting and final setting of the phosphogypsum ceramsite balls produced in S2 at 30° C.; wherein the initial setting time is 12 h and the final setting time is 24 h; curing for 14 days by using water immersion after the initial setting and final setting;

S4: transferring the phosphogypsum ceramsite balls produced in S3 to a site with dust-proof facilities for stacking, and drying naturally until the moisture content of the phosphogypsum ceramsite balls is 6%;

S5: crushing the phosphogypsum ceramsite balls to a particle size of 10-40 mm to obtain the phosphogypsum ceramsite balls light aggregate;

S6: sieving and classifying the phosphogypsum ceramsite balls light aggregate, and storing based on classification;

S7: classifying and inspecting in batches and identifying the phosphogypsum ceramsite balls light aggregate.

Example 7

The production process of the phosphogypsum non-sintered ceramsite light aggregate in example 1 is as follows:

S1: putting the above materials into a mixer and mixing uniformly;

S2: granulating the above mentioned uniformly mixed raw materials with adding water according to the weight percentage, wherein the granulation equipment has an inclination angle of 60°, and the water is added at a rate of 1.5 L/min;

S3: performing initial setting and final setting of the phosphogypsum ceramsite balls produced in S2 at 15° C.; wherein the initial setting time is 20 h and the final setting time is 36 h; curing for 28 days by using water immersion after the initial setting and final setting;

S4: transferring the phosphogypsum ceramsite balls produced in S3 to a site with dust-proof facilities for stacking, and drying naturally until the moisture content of the phosphogypsum ceramsite balls is 6%;

S5: crushing the phosphogypsum ceramsite balls to a particle size of 10-40 mm to obtain the phosphogypsum ceramsite balls light aggregate;

S6: sieving and classifying the phosphogypsum ceramsite balls light aggregate, and storing based on classification;

S7: classifying and inspecting in batches and identifying the phosphogypsum ceramsite balls light aggregate.

The detection results were shown in table 2:

TABLE 2

Statistical table of detection structures of examples 5-7

| Example | Bulk density | Cylindrical compress strength | Water absorption for 1 h | Softening coefficient |
|---|---|---|---|---|
| 5 | 998 kg/m$^3$ | 6.8 MPa | 4.1% | 0.98 |
| 6 | 995 kg/m$^3$ | 6.75 MPa | 4.3% | 0.95 |
| 7 | 996 kg/m$^3$ | 6.72 MPa | 4.4% | 0.96 |

All performance indicators of the phosphogypsum non-sintered ceramsite light aggregate prepared using the above preparation process parameters exceed the performance standards for light aggregate in the national standard GB/T17431.2-20101.

What is claimed is:

1. A method of preparing a phosphogypsum non-sintered ceramsite light aggregate, wherein the method comprises the following steps:
    S1: putting phosphogypsum, mineral powder, and cement into a mixer according to a weight percentages and mixing uniformly; wherein the mixture has weight percentages of phosphogypsum 80-90%, mineral powder 3.3-10%, cement 6.5-10%;
    S2: granulating the uniformly mixed raw materials with adding water to produce phosphogypsum ceramsite balls, wherein a granulation equipment has an inclination angle of 60-82°, and the water is added at a rate of 1.25-1.5 L/min; the water has a weight of 17% of total weight of the mixture;
    S3: performing an initial setting and a final setting of the phosphogypsum ceramsite balls produced in S2 at 15-30° C.; wherein the initial setting time is 12-20 h and the final setting time is 24-36 h; curing for 14-28 days by using water immersion or continuous sprinkling water after the initial setting and final setting;
    S4: transferring the phosphogypsum ceramsite balls produced in S3 to a site with dust-proof facilities for stacking, and drying naturally until a moisture content of the phosphogypsum ceramsite balls is not more than 8%;
    S5: crushing the phosphogypsum ceramsite balls to a particle size of 10-40 mm to obtain the phosphogypsum non-sintered ceramsite balls light aggregate;
    S6: sieving and classifying the phosphogypsum non-sintered ceramsite balls light aggregate, and storing according to classification.

2. The method of preparing the phosphogypsum non-sintered ceramsite light aggregate of claim 1, wherein the water for curing the phosphogypsum ceramsite balls is reused after precipitation and/or filtration.

3. The method of preparing the phosphogypsum non-sintered ceramsite light aggregate of claim 1, wherein the phosphogypsum has a pH value greater than 3.0, the phosphogypsum has fineness of 80 μm and a sieve residue not more than 20%, the mineral powder is S95 grade, and the cement is Portland cement PO42.5.

4. The method of preparing the phosphogypsum non-sintered ceramsite light aggregate of claim 3, wherein the raw materials of the mixture have weight percentages of phosphogypsum 80%, mineral powder 10%, cement 10%.

5. The method of preparing the phosphogypsum non-sintered ceramsite light aggregate of claim 3, wherein the raw materials of the mixture have weight percentages of phosphogypsum 85%, mineral powder 8.5%, cement 6.5%.

6. The method of preparing the phosphogypsum non-sintered ceramsite light aggregate of claim 3, wherein the raw materials of the mixture have weight percentages of phosphogypsum 88%, mineral powder 5.5%, cement 6.5%.

7. The method of preparing the phosphogypsum non-sintered ceramsite light aggregate of claim 3, wherein the raw materials of the mixture have weight percentages of phosphogypsum 90%, mineral powder 3.3%, cement 6.7%.

* * * * *